(12) United States Patent
Minarovic

(10) Patent No.: US 7,081,820 B2
(45) Date of Patent: Jul. 25, 2006

(54) SURFACE TRACKER

(76) Inventor: Joe T. Minarovic, 201 Logan Ranch Rd., Georgetown, TX (US) 78628

( * ) Notice: Subject to any disclaimer, the term of this patent is extended or adjusted under 35 U.S.C. 154(b) by 122 days.

(21) Appl. No.: 10/799,559

(22) Filed: Mar. 11, 2004

(65) Prior Publication Data

US 2005/0200484 A1     Sep. 15, 2005

(51) Int. Cl.
*G08B 13/14* (2006.01)
(52) U.S. Cl. .............. 340/572.8; 340/572.1; 340/568.1; 340/541; 324/66; 324/67; 324/326; 116/200; 116/209; 343/867
(58) Field of Classification Search ............ 340/572.8, 340/572.1, 568.1, 541, 551, 572.2, 572.7; 324/66, 67, 326; 116/200, 209; 343/867, 343/719
See application file for complete search history.

(56) References Cited

U.S. PATENT DOCUMENTS

| | | | | |
|---|---|---|---|---|
| 4,932,910 A | * | 6/1990 | Hayday | ...................... 441/11 |
| 5,532,598 A | * | 7/1996 | Clark et al. | .................. 324/326 |
| 5,949,373 A | * | 9/1999 | Eslambolchi et al. | .. 342/357.13 |
| 5,984,877 A | * | 11/1999 | Fleischhacker, Jr. | ......... 600/585 |
| 6,049,279 A | * | 4/2000 | Minarovic | ............... 340/572.8 |
| 6,133,738 A | * | 10/2000 | Minarovic | ................... 324/326 |
| 6,421,928 B1 | * | 7/2002 | Miller | ......................... 33/520 |
| 6,933,438 B1 | * | 8/2005 | Watts et al. | ................... 174/48 |

* cited by examiner

*Primary Examiner*—Jeffery Hofsass
*Assistant Examiner*—Daniel Previl
(74) *Attorney, Agent, or Firm*—Jack V. Musgrove

(57) ABSTRACT

A surface tracker includes a tubular marker body having an interior electronic marker and a visual indicator attached to an upper end of the marker body which extends away from the marker body. When deployed, the marker body is mostly underground and the visual indictor extends upwardly from the ground level to provide above-ground visual recognition. The visual indicator may be a plurality of resilient filaments which pass through a hole in a tab portion of the marker body at the upper end thereof, the filaments being folded about the tab portion and secured to the tab portion using a heat-shrink tube. The visual indication, along with the ability to electronically detect the marker, provides a tracker with superior locating capability.

8 Claims, 4 Drawing Sheets

SURFACE TRACKER

BACKGROUND OF THE INVENTION

1. Field of the Invention

The present invention generally relates to devices used to electromagnetically mark and locate obscured objects, and more particularly to a surface tracker adapted to visually mark a buried object or a location at the surface or ground level, which also provides a transponder or marker to enable the later location of the tracker when it becomes buried.

2. Description of the Related Art

Buried conduits are employed for supplying a wide variety of utilities, including pipelines for gas, water and sewage, and cables for telephone, optical fiber, power and television. It often becomes necessary to locate defective or damaged cables, pipes, etc., in order to repair or replace them. Conversely, it is important to know with as much accuracy as possible the approximate vicinity of such items in order to avoid disturbing them when digging or excavating for other purposes. Above-ground marking devices may be installed immediately after the conduit is buried, but they are often lost, stolen, or destroyed after a short period of use. Therefore, it is common to use underground marking devices or systems to enable the later location of a section or feature of an underground utility.

In the past, three different approaches have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot distinguish the trace wire from any other conductor in the vicinity.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means. See generally, U.S. Pat. No. 5,045,368.

FIG. 1 illustrates several kinds of passive transponders for different applications. These include a small, near-surface marker 2 for locating a valve box, a medium size or mid-range marker 4 for locating a service drop (a loose coil of cabling deployed for future use), a full-range marker 6 for locating a more deeply buried conduit stub, and a so-called ball marker 8 for locating a conduit tee. The latter marker provides a spherical housing which supports the marker coil horizontally, regardless of the orientation of the housing (i.e., self-leveling), and is used for soil conditions which may result in significant shifting of the housing, such that the marker always provides a vertical location beacon (inductor axis). These markers simply "float" around the underground feature in the soil, and are subject to soil movement.

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection.

While several of the foregoing articles can be used to alert an excavation team that a buried object is nearby, there continue to be problems regarding both locating and damaging the cables or conduits. Significantly, none of the foregoing designs offer any above-ground visual indication of the desired location, so a fair amount of trial and error searching must be performed before the signal from the subsurface marker is detected. If there are several underground markers in the same general vicinity, it is very likely that the searcher will mistakenly identify one of the other markers as the target marker, resulting in a mislocate of the obscured object which is only revealed after the site has been excavated. Although a location can be marked above-ground with stakes, paint, flags, etc., these implements can be removed or easily obscured by growth over time. Stakes and flags can further be re-positioned at the surface so there is no guarantee that such an implement will still be marking the proper location at later dates.

In light of the foregoing, it would be desirable to devise an improved article for more accurately locating a buried object during interim construction which also has long-term locatability. It would be further advantageous if the article could provide a visual indication which is easily detected by an excavator.

SUMMARY OF THE INVENTION

It is therefore one object of the present invention to provide an improved electronic marker for locating a buried or obscured object such as an underground conduit or cable.

It is another object of the present invention to provide such a marker which provides an above-ground visual indication of the presence of the marker.

It is yet another object of the present invention to provide an electronic marker which provides for long-term locatability.

The foregoing objects are achieved in a surface tracker generally comprising a tubular marker body having an electronic marker located inside an interior chamber, and a visual indicator attached to an upper end of the marker body which extends away from the marker body. In the illustrative implementation, the surface tracker is partially buried, with the marker body being mostly underground, while the visual indictor extends upwardly from the ground level to provide above-ground visual recognition. An end cap may be bonded to the lower end to seal an opening that allows insertion of the electronic marker. The electronic marker may be a passive electronic marker that includes a ferrite core assembly having a longitudinal axis which is generally parallel to a longitudinal axis of the marker body. The visual indicator may comprise a plurality of resilient filaments which pass through a hole in a tab portion of the marker body at the upper end thereof, the filaments being folded about the tab portion and secured to the tab portion using a heat-shrink tube. In an exemplary embodiment, the filaments extend about six inches from the marker body. Multiple trackers can be deployed to mark the path of a buried utility. Due to the resilient and durable nature of the filaments, they are resistant to wear and tear and the elements. The visual indication, along with the ability to electronically detect the marker, provides a tracker with superior locating capability.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
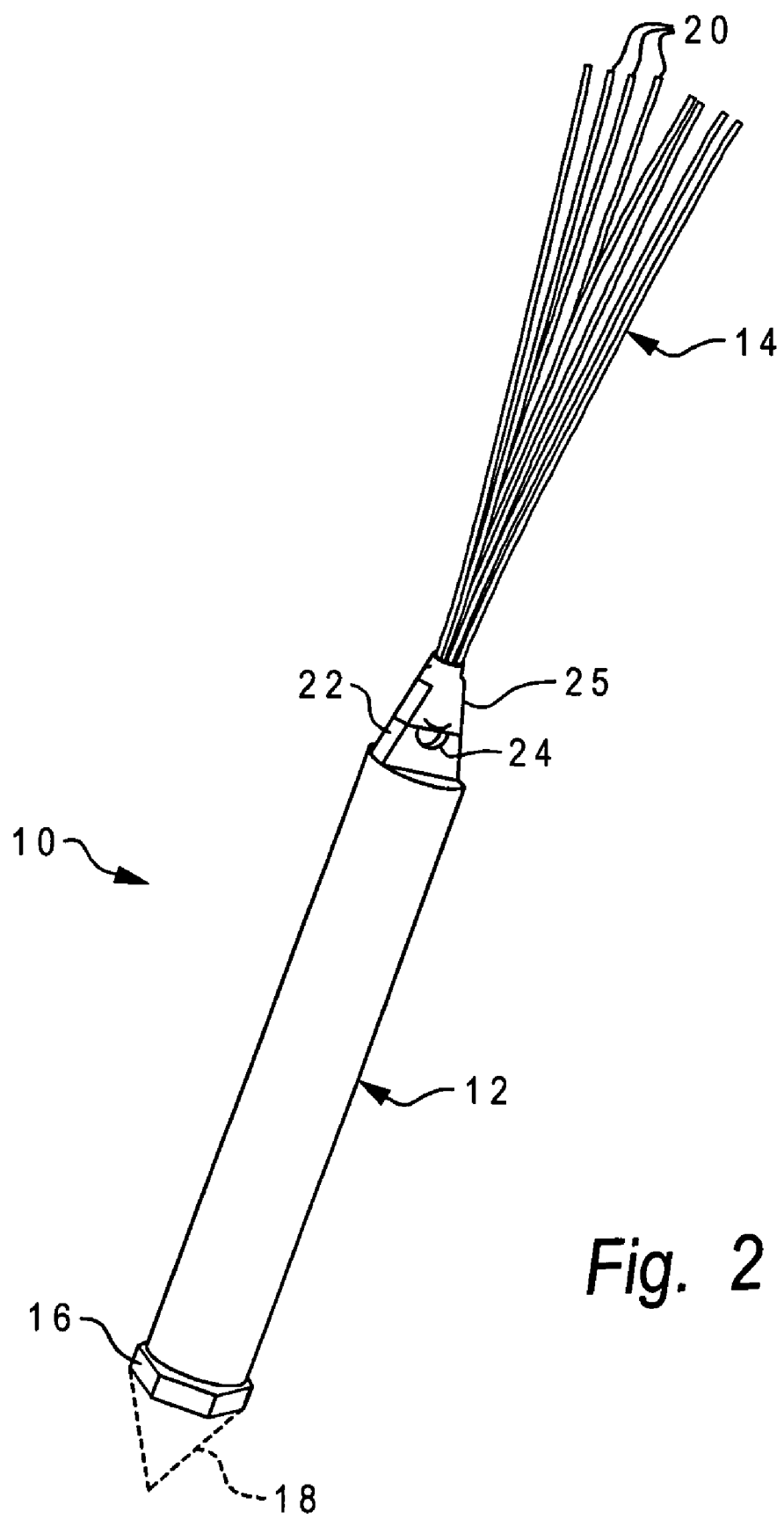
FIG. 2 is a perspective view of one embodiment of a surface tracker constructed in accordance with the present invention, having an electronic marker and a filament bundle that provides a visual indication of the presence of the marker.
Figure 3:
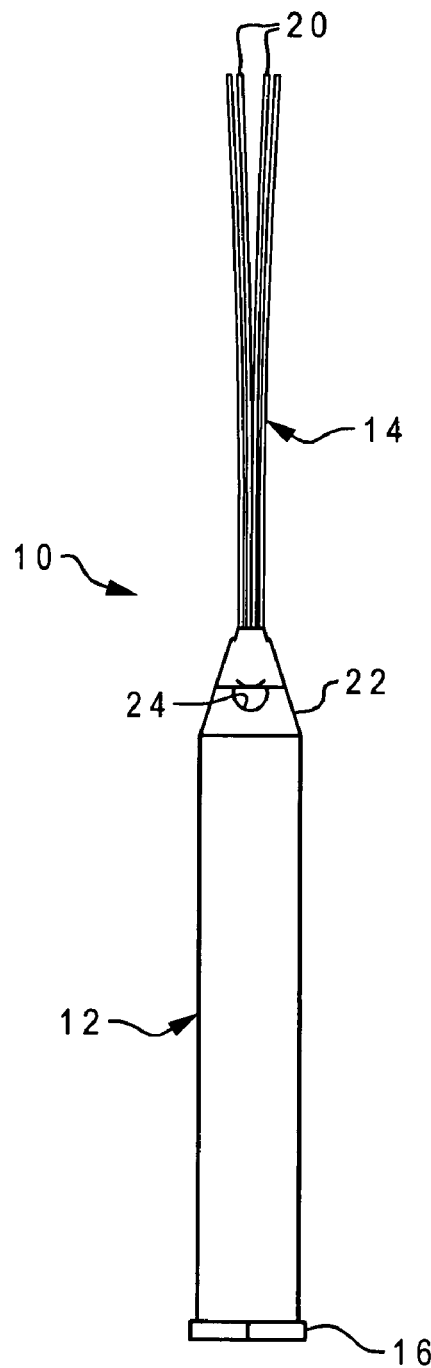
FIG. 3 is a front elevational view of the surface tracer of FIG. 2.
Figure 4:
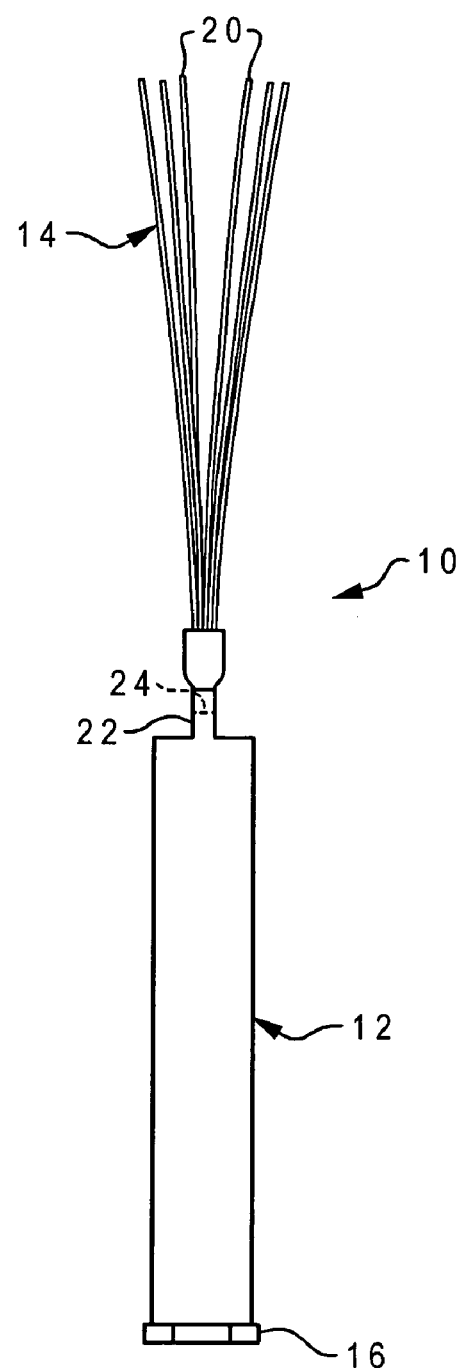
FIG. 4 is a side elevational view of the surface tracer of FIG. 2.

With reference now to the figures, and in particular with reference to FIGS. 2–4, there is depicted one embodiment 10 of a surface tracker constructed in accordance with the present invention. Surface tracker 10 is generally comprised of a marker body 12 and a visual indicator 14. In this embodiment, marker body 12 has a generally cylindrical (tubular) casing, and houses a passive electronic marker as discussed further below. A cap 16 at the lower end of marker body 12 is used to seal the end opening that receives the interior passive electronic marker. End cap 16 may optionally have a pointed (conical) protrusion 18 to facilitate the insertion of marker body 12 into the ground. End cap 16 may take the form of a screw plug having threads which mate with matching threads along the interior wall of marker body 12. Marker body 12 and end cap 16 may be formed of any durable material, particularly a moldable polymer such as polyethylene. Marker body 12 may be constructed using insert molding or other molding techniques. End cap 16 may be sealed against the lower end of marker body 12 using fusion bonding or a hot-melt adhesive to provide further environmental protection against moisture intrusion.

In the illustrative embodiment, visual indicator 14 comprises a plurality of whiskers or filaments 20 that generally extend away from marker body 12 along its longitudinal axis, i.e., vertically or upwardly during actual use of surface tracker 10. Marker body 12 has a tab 22 integrally formed (molded) therewith at its upper end, with a grommet or eyelet 24 which is used to attach indicator filaments 20. The filaments are further secured at tab 22 using elastic or thermoelastic (heat-shrink) tubing 25. Other means, such as adhesives, rings or clamps, could be used to secure the visual indicator to the marker body. The number of filaments employed can vary considerably, for example, 20–25 filament sections which are folded at eyelet 24 to yield 40–50 filaments. The filaments may be constructed of any material which can be formed into durable fibers or strands, preferably a polymer such as nylon or polypropylene. Filaments 20 are preferably resilient so as to snap back from any bending or deformation and retain their vertical orientation to facilitate visual observation. Filaments 20 may have a bright color like orange to be readily identifiable. Other visual indicators besides the filaments could be used, such as ribbons, rods, flags, etc. A battery may optionally be included to power a light source as part of the visual indicator. To extend battery life, the light source may have control electronics which sense a locator-marker signal and power the light source only when the locator signal is present.

Figure 5:
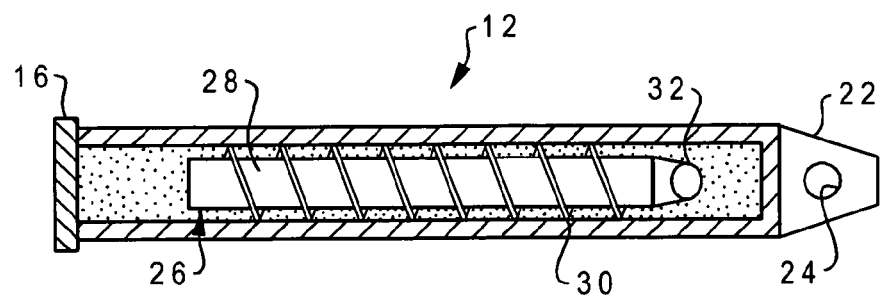
FIG. 5 is a cross-section of the marker body portion of the surface tracker of FIG. 2 illustrating the interior passive electronic marker.

Referring now to FIG. 5, marker body 12 is shown in cross-section to illustrate the interior electronic marker 26. In the illustrative embodiment, electronic marker 26 is a passive marker, i.e., it does not use an active power source such as a battery, but rather is powered by the locator-marker signal that is emitted from an above-ground transceiver unit, and is comprised of a ferrite core assembly. The ferrite core assembly includes a ferrite rod 28, a wire coil 30 which is wrapped around ferrite rod 28, and a capacitor 32 connected to the ends of wire coil 30. Ferrite core assembly 26 forms a resonant LC circuit which absorbs energy from the transceiver signal during a receive phase, and then emits a return or echo signal during a send phase. The specifications of ferrite core assembly 26 are selected to tune the marker to a particular designated frequency, e.g., 101.4 kHz for buried telephone or CATV cables. Ferrite core assembly 26 is located within the interior chamber of marker body 12 and may be wrapped in a protective layer (e.g., heat-shrink tubing) for environmental protection. Ferrite core assembly 26 may further be surrounded by a sealing or potting material such as epoxy or wax which is injected into the interior chamber. The longitudinal axis of the ferrite core is generally aligned with (parallel to) the axis of marker body 12.

The dimensions of surface tracker 10 may vary considerably according to the particular application. The following dimensions are exemplary. Marker body 12 is about 4½" long (not including end cap 16 or tab 22) with a ⅞" outer diameter, and tab 22 is about 1" long. Ferrite core 28 is about 2" long with a ¼" diameter. The filament sections are about 12" long which, after folding, provides 6" long filaments. The overall length of surface tracker 10 is about 11".

Surface tracker 10 may be manufactured according to a variety of methods depending upon the particular embodiment selected. For the depicted embodiment, it is preferable to complete the assembly of mark body 12 before attachment of visual indicator 14. Marker body 12 is assembled by inserting electronic marker 26, filling the remainder of the interior chamber with sealing gel, and then fitting end cap 16 onto the lower end of marker body 12. As noted above, the end cap can further be bonded to the marker body, e.g., using a hot-melt adhesive applied with a glue gun. After marker body 12 has been assembled, the filament sections are cut to the desired length and inserted through eyelet 24, and folded to extend away from marker body 12. A piece of heat-shrink tubing is threaded over the filaments after folding, placed about the upper end of tab 22, and then heated to shrink down the tubing and clamp the filaments in place. The foregoing process steps may be automated.

Figure 6:
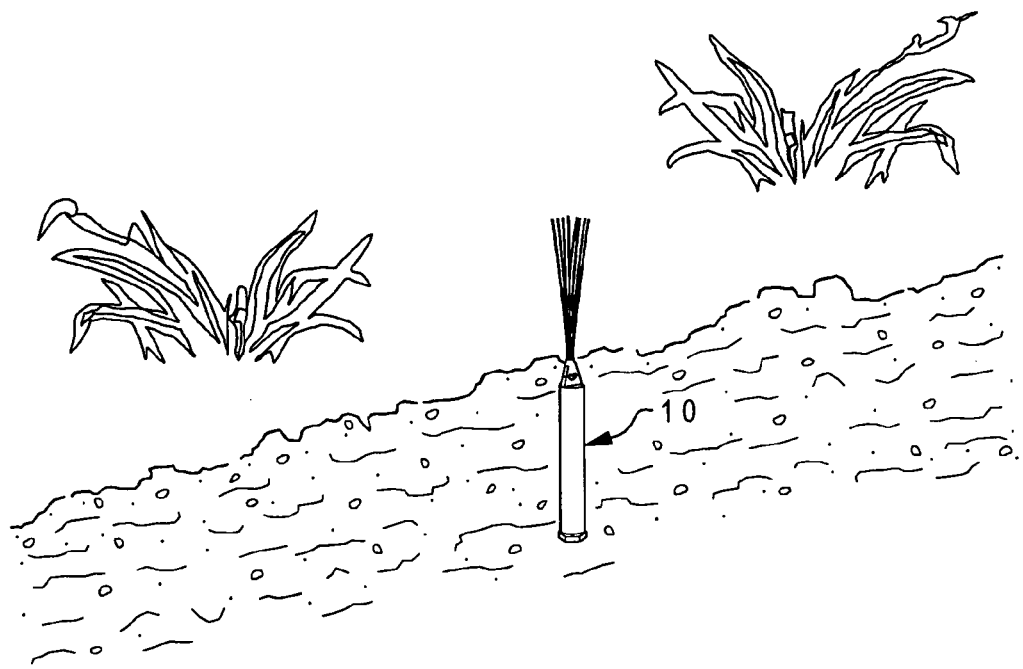
FIG. 6 is a perspective view of the surface tracker of FIG. 2 as used in the field to mark a buried object.

With further reference to FIG. 6, surface tracker 10 is shown as deployed for actual use in marking a particular field location. Marker body 12 is mostly buried, with tab 22 just protruding from the earth and filaments 20 extending upwardly above ground. Multiple trackers can be so used to mark the path of a buried utility. Due to the resilient and durable nature of the filaments, they are resistant to wear and tear and the elements, and can be bent, stepped on, and even mowed over several times and still provide a strong visual indication of the presence of the tracker. This visual indication, along with the ability to electronically detect the marker, provides a tracker with superior locating capability. The above-ground visual indicator also alerts construction personnel to the presence of objects or areas which are to be avoided during the construction phase.

When the tracker is first buried, the construction crew can optionally determine the global positioning satellite (GPS) coordinates for the tracker using a GPS receiver, and record a log entry for those coordinates. If a later field crew is having difficulty visually recognizing the above-ground indicator features (e.g., new vegetation growth hides the filaments), the GPS coordinates can be used to establish a general vicinity to search for the marker with an electronic receiver.

In addition to electronically marking a buried object, surface tracker 10 acts as a visible anti-dig warning device, even if the tracker itself becomes buried. The bright orange filaments alert the digger of the close proximity of the object. Once the surface tracker is recognized, the excavation team can hand-dig to the underground utility structure.

Figure 1:
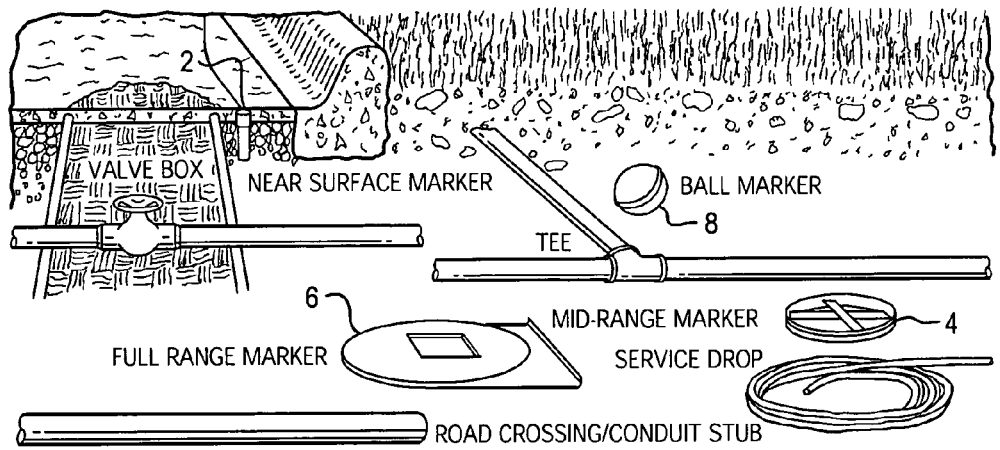
FIG. 1 is a pictorial representation of various underground utility structures which have been marked with conventional electronic transponders to allow location of the structures.
Figure 7:
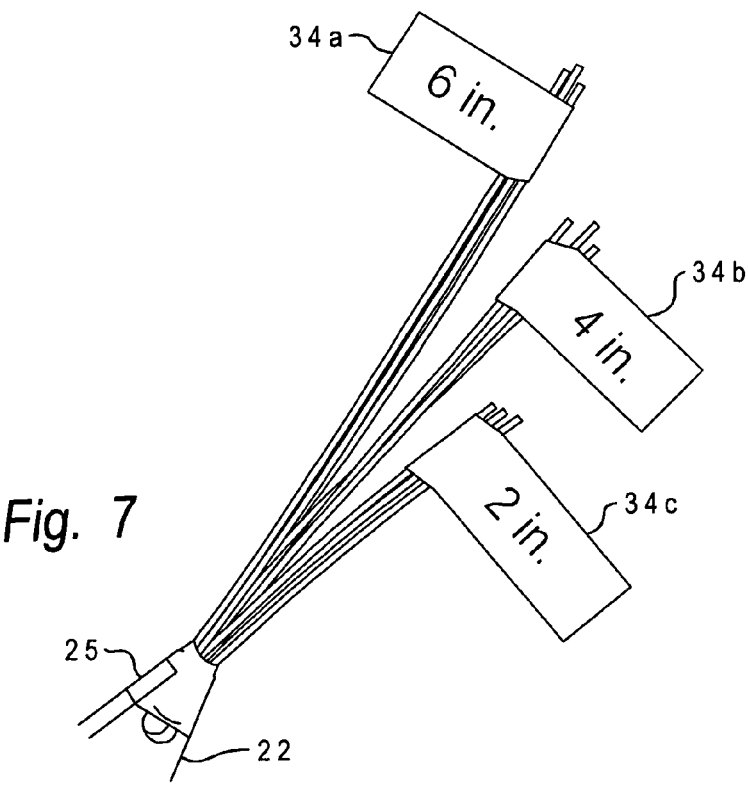
FIG. 7 is a perspective view of an alternative embodiment of the filament bundle having staggered length sections with attached flags bearing a height/depth indication.

FIG. 7 illustrates a further embodiment of the invention wherein several filaments are bundled together in different length sections by flags 34a, 34b, 34c bearing an indication of the height/depth of the surface tracker. The flags can be constructed of colored adhesive-backed tape which also serves to strap together a filament bundle. For example, the filaments may be separated into three bundles having lengths (as measured from the tip of marker body 12 to the base of the flag strip) of 6", 4" and 2". In this manner, the surface tracker can be used in conjunction with different fill operations such as grading for roads, sewer lines, agricultural contours or other elevational applications which deposit a variable depth of surface or subsurface material(s). The flags for different steps can be of different colors to aid the equipment operator.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of manufacturing a surface tracker, comprising the steps of:
    inserting an electronic marker in a marker body, the electronic marker being adapted to emit a locating signal;
    sealing the electronic marker within the marker body; and
    attaching a visual indicator to said marker body, said visual indicator extending away from said marker body, wherein the visual indicator comprises a plurality of resilient filaments, and said attaching step includes the steps of inserting the filaments in a hole formed at one end of the marker body, folding the filaments where they pass through the hole, and securing the filaments to the end of the marker body.

2. The method of claim 1 wherein the marker body is elongate, and said attaching step attaches the visual indicator in such a manner that the visual indicator extends away from the marker body along a longitudinal axis thereof.

3. The method of claim 1 wherein the marker body is elongate, the electronic marker includes a ferrite core assembly, and said inserting step inserts the ferrite core assembly with a longitudinal axis thereof generally parallel to a longitudinal axis of the marker body.

4. The method of claim 1 wherein said sealing step includes the step of screwing an end cap onto an open end of the marker body.

5. The method of claim 4 wherein said sealing step further includes the step of bonding the end cap to the open end of the marker body.

6. The method of claim 1 wherein said securing step utilizes heat-shrink tubing to clamp the filaments together at the end of the marker body.

7. The method of claim 1 further comprising the step of bundling portions of the filaments in different length sections with flags bearing height/depth indications.

8. A surface tracker which provides electronic locatability and above-ground visual recognition, comprising:
- a generally cylindrical marker body having an interior chamber, a lower end, and an upper end, with an opening at said lower end and an integrally formed tab at said upper end, there being a hole formed in said tab;
- an end cap which is bonded to and seals said opening;
- a passive electronic marker located inside said interior chamber of said marker body, said electronic marker including a ferrite core assembly having a longitudinal axis which is generally parallel to a longitudinal axis of said marker body;
- a plurality of resilient filaments which pass through said hole in said tab of said marker body, said filaments being folded about said tab to extend away from said marker body; and
- means for securing said filaments to said tab.

* * * * *